United States Patent [19]

Yan

[11] 3,979,279

[45] Sept. 7, 1976

[54] TREATMENT OF LUBE STOCK FOR IMPROVEMENT OF OXIDATIVE STABILITY

[75] Inventor: Tsoung-Yuan Yan, Trenton, N.J.

[73] Assignee: Mobil Oil Corporation, New York, N.Y.

[22] Filed: June 17, 1974

[21] Appl. No.: 480,062

[52] U.S. Cl. .................................. 208/264; 208/18
[51] Int. Cl.² ........................................ C10G 23/04
[58] Field of Search .............. 208/18, 143, 264, 217

[56] References Cited
UNITED STATES PATENTS

| | | | |
|---|---|---|---|
| 2,756,183 | 7/1956 | Knox | 208/264 |
| 2,885,352 | 5/1959 | Ciapetta et al. | 208/217 |
| 2,915,452 | 12/1959 | Fear | 208/264 |
| 2,917,448 | 12/1959 | Beuther et al. | 208/264 |
| 3,172,839 | 3/1965 | Kozlowski | 208/143 |
| 3,431,198 | 3/1969 | Rausch | 208/264 |

*Primary Examiner*—Herbert Levine
*Attorney, Agent, or Firm*—Charles A. Huggett; Raymond W. Barclay; Dennis P. Santini

[57] ABSTRACT

A stabilized lubricating oil stock resistant to oxidation and sludge formation upon exposure to a highly oxidative environment is formed by contacting the lubricating oil stock with hydrogen in the presence of a catalyst of low acidity comprised of a platinum-group metal on a solid refractory inorganic oxide support.

A benefit of the present treatment process is that a high sulfur lubricating oil stock can be converted hereby into a stock which can be formulated using an additive package not containing a zinc-based component.

20 Claims, No Drawings

TREATMENT OF LUBE STOCK FOR IMPROVEMENT OF OXIDATIVE STABILITY

FIELD OF THE INVENTION

This invention relates to the production of improved lubricating oils. In particular, it relates to the preparation of stable lubricating oils which are highly resistant to oxidation and sludge formation when exposed to a highly oxidative environment.

DESCRIPTION OF PRIOR ART

It is well-known that certain types of organic compounds are normally susceptible to deterioration by oxidation or by corrosion through coming into contact with various metal surfaces. For example, it is known that liquid hydrocarbons in the form of fuels or lubricating oils tend to accumulate considerable quantities of water when maintained for long periods of time in storage vessels; and when subsequently brought into contact with metal surfaces in their functional environments, deterioration as a result of corrosion occurs. As a further example, in modern internal combustion engines and in turbojet engines, lubricants can be attacked by oxygen or air at high temperatures to form heavy viscous sludges, varnish and resins which become deposited on the engine surfaces. As a result, the lubricant cannot perform its required task effectively, and the engine does not operate efficiently. Furthermore, the sludges produced by lubricant deterioration generated by insufficient oxidative stability tend to foul and plug low tolerance hydraulic system components and interconnecting piping and valves. In addition, where such lubricating oils or other corrosion-inducing materials are incorporated into solid lubricants as in the form of greases, similar results are encountered, thus clearly indicating the necessity for improved methods of treatment which increase the oxidative stability of lubricating oils.

Accompanying the deterioration of lubricants by oxidation is the resultant corrosion of the metal surfaces for which such lubricants are designed and supplied. Once a lubricant has been oxidized to produce viscous sludges and resins, acids develop which are corrosive enough to destroy most metals. Moreover, the friction between metal parts increases following lubricant breakdown due to oxidation and leads to excessive metal wear. Increasing demands on lubricants, brought about by large engines operating at steadily increasing temperatures and pressures, and often at higher speeds, necessitate a constant search for new methods of hydrocarbon treatment which can provide lubricants with increased oxidation resistance.

Due to the lubricant oxidative stability requirements for such newer and larger engines and other rotating or moving equipment lubrication, feedstocks which were previously suitable for lubricant production are presently unsuitable or at best marginal for such uses. Thus at a time when overall lubricant demands are increasing, the amount of suitable lubricant feedstock material is being diminished due to the oxidative stability requirements of newer and larger machinery.

Hydrocarbon lubricating oils have been obtained by a variety of processes in which high boiling fractions are contacted with hydrogen in the presence of hydrogenation-dehydrogenation catalysts at elevated temperatures and pressures. In such processes, there is a consumption of hydrogen. Lubricating oil fractions are separated from the resulting products. Such lubricating oil fractions differ from those obtained by fractional distillation of crude oils and the like, since they have such relatively high viscosity index values that solvent extraction treatments are generally not required to enhance their viscosity index values. Such lubricating oil fractions suffer from the shortcoming that they are unstable when exposed to highly oxidative environments. When so exposed, sediment and lacquer formation occurs, thus lessening the commercial value of such lubricants.

Methods in the art directed to lessening such a shortcoming are exemplified by U.S. Pat. No. 3,436,334, which teaches making a lubricating oil product fraction resistant to deterioration upon exposure to light and air by contacting high boiling hydrocarbons with hydrogenation/dehydrogenation catalysts and hydrogen with hydrogen consumption, and thereafter dehydrogenating the resulting product on contact with a metal oxide or with a metal and oxygen. The method employs high temperatures of from 500° to 1000°F.

U.S. Pat. No. 2,604,438 teaches a "hydroforming" process for catalytic dehydrogenation of light (i.e. boiling at less than 600°F) hydrocarbon oils, presumably to increase aromatic content. The patent discloses the known fact that in processes of that nature, the presence of a small amount of sulfur in the feed has a beneficial effect. It further states that when the oil to be "hydroformed" has no sulfur, i.e. no sulfur in the light hydrocarbon feed, then a small amount of sulfur, e.g., a reducible sulfur compound, is added to the feed. The patent emphasizes that the invention disclosed therein is only advantageous when the process is carried out at a temperature conducive to dehydrogeneration, i.e., at a temperature of at least 825°F. Proclaimed in the patent is the fact that when lower temperatures are used, e.g. 350° to 650°F as in the present invention, the described method offers no advantage.

Further, it is noted that some oils, such as hydraulic oils, require anti-wear properties. For such oil, a zinc-containing additive, such as zinc dithiophosphate, is useful. However, these zinc-containing additives may tend to produce sludge upon oxidation. For oils such as turbine oils, the cleanliness of the oil upon usage and oxidation is very important. In this type of oil, no zinc-containing additive can be used. Without the zinc-containing additive, a base stock derived from a low sulfur crude shows good oxidation stability, but those derived by the present art methods from high sulfur crudes show quite poor oxidation stability.

Accordingly, it is an object of this invention to provide a method whereby the oxidative stability of lubricating oil stocks is improved.

Also it is an object of this invention to provide a method whereby a lube base stock responsive to non-zinc-containing additive packages can be produced from high sulfur crudes.

A further object of this invention is to provide for a method of treatment whereby hydrocarbon feedstocks presently of poor or marginal lubricant quality may be upgraded through oxidative stability improvement in order to produce lubricants having sufficiently high anti-oxidation qualities.

Another object of this invention is to provide for a method of lubricating oil stock treatment whereby the lubricant produced has sufficient oxidative stability to substantially reduce metals corrosion and wear when employed as a lubricant for such metals.

Other objects and advantages of this invention will become apparent upon reading the following detailed description and claims.

SUMMARY OF THE INVENTION

In accordance with the present invention there is provided a process and means for forming lubricating oils which are highly resistant to deterioration, e.g. oxidation and sludge formation, upon exposure to a highly oxidative environment.

The process of the present invention comprises contacting a lubricating oil stock, such as, for example, from a Midcontinental U.S.A. crude or an Arabian crude, with hydrogen in the presence of a catalyst of low acidity comprised of a platinum-group metal, such as, for example, platinum or palladium, on a solid refractory inorganic oxide support, such as, for example, alumina, a siliceous material, a clay or an aluminosilicate, at a temperature (T) in the range of from about 350°F to about 650°F, a pressure (P) in the range of from about 150 psig to about 1200 psig, and a liquid hourly space velocity (LHSV) in the range of from about 0.1 to about 10.

DESCRIPTION OF SPECIFIC EMBODIMENTS

The lubricating oil stock which may be treated in accordance with the present invention may generally be any high boiling range materials boiling above about 600°F. Such lubricating oil stock materials include those obtained by fractionation, as by, for example, vacuum distillation, of crude oils identified by their source, i.e. Pennsylvania, Midcontinent, Gulf Coast, West Texas, Amal, Kuwait, Barco, Aramco and Arabian. Said oil stock material may be one having a substantial part thereof of the fractionation product of the above crude oils mixed with other oil stocks.

Both high sulfur oil stock, i.e. having a sulfur content above about 0.4 weight percent, and low sulfur oil stock may be treated in accordance herewith to achieve a stabilized lubricating oil stock. It is noted in this regard that high sulfur oil stock can be converted hereby into a stabilized oil stock which can be formulated using a non-zinc-containing additive package.

The catalyst material for use herein preferably has a low acidity, such as, for example, when measured by chlorine content, of less than about 1.5 percent by weight, and is comprised of a platinum-group metal on a solid refractory inorganic oxide support material. The metals may be, for example, platinum, palladium, or a combination thereof, present in an amount of from about 0.1 to about 10 weight percent of the total catalyst material, and preferably within the range of from about 0.3 to about 1.0 weight percent. The support material may be one selected from the group consisting of alumina, a siliceous material, an aluminosilicate, a clay and combinations thereof, with a most desirable limitation being that whichever support material is used is not diffusion limited, i.e. has a relatively high diffusivity.

Non-limiting examples of the alumina support materials include any of the alumina materials currently available on the market, which includes "Gamma", "Eta", "Theta" and "Alpha" forms.

Non-limiting examples of the clays which may be useful as the support material for the catalyst in the process of this invention include the montmorillonite and kaoline families, which families include the subbentonites and the kaolins commonly known as Dixie, McNamee, Georgia and Florida clays, or others in which the main mineral constituent is halloysite, kaolin, dickite, nacrite, attapulgite or anauxite. Such clays can be used in the raw state as mined or initially subjected to calcination, acid treatment or chemical modifications.

Non-limiting examples of siliceous materials useful as the support material in the present invention include silica and combinations thereof with oxides of metals of Groups II-A, III-A, IV-B and V-B, such as, for example, silica-alumina, silica-magnesia, silica-zirconia, silica-thoria, silica-beryllia, silica-titania, as well as ternary compositions of silica, such as, for example, silica-alumina-thoria and silica-alumina-zirocnia.

Non-limiting examples of aluminosilicate materials which may be useful as the support material for the catalyst herein include the synthetic zeolites A, B, L, T, X, Y, ZK-4, ZK-5, ZSM-4, ZSM-5 and others, and the natural zeolites levynite, dachiarite, erionite, faujasite, analcite, paulingite, noselite, phillipsite, chabazite, leucite, morgenite and others.

An effective method of insuring that the catalyst for use herein has low acidity is by ammonia washing the catalyst material prior to its use. To accomplish this, one may follow the following outlined procedure:

The catalyst material is:

A. reduced in hydrogen by heating it to about 550°F and holding at that temperature for about one hour;
B. then heated to about 850°F and cooled in flowing hydrogen to about room temperature;
C. then packed in a device such as a column and washed with 0.1 N ammonia solution until the wash solution is chloride free;
D. then dried and calcined as in above steps A and B.

Although the catalyst for the present process has exceptional stability and catalytic life, it does lose some of its activity during use and, therefore, may be regenerated. The spend catalyst is contacted with a free oxygen-containing atmosphere at an elevated temperature sufficient to burn carbonaceous deposits from the catalyst. Conditions for regenerating the catalyst include a temperature between about 600°F and about 1,000°F, a pressure of from atmospheric to about 500 pounds per square inch, a total gas flow rate of from about 1 to about 20 volumes per volume of catalyst per minute and an oxygen concentration of from about 0.1 percent to 100 percent. The oxygen can be diluted with steam, nitrogen or other inert gas.

The operating parameters in the present process are critical to achieving the desired result of degree of improvement or upgrading product quality of the lubricating oil stock treated without loss in yield. The reaction vessel must be pressurized with hydrogen at a pressure within the range of about 150 psig to about 1200 psig, with a preferred pressure range being from about 250 psig to about 600 psig. The process temperature must be maintained in the range of from about 350°F to about 650°F, with a preferred temperature range being from about 400°F to about 600°F. The liquid hourly space velocity to be maintained for proper efficiency of the process is from about 0.1 to about 10, with a preferred range of from about 0.5 to about 5.

It is interesting to note that the oxidative stability of a lubricating oil treated in accordance herewith, as indicated by ASTM test designation D 2272-67, hereinafter referred to as the "RBOT" test, does not correlate with the sulfur content of the oil. This phenomenon is contrary to the belief that sulfur removed must be minimized to improve the oxidative stability of hydrofinished oil.

Further, the present process provides the additional benefit of effective decolorization of the lubricating oil stock treated as well as improved demulsibilty thereof.

In order to more fully illustrate the process of the present invention, the following specific examples, which in no sense limit the invention, are presented. The test procedures used in evaluation of the product yield from the present process are standard tests designated ASTM:D2272-67 (RBOT oxidation stability test) and ASTM: D 1500-1 (color test).

EXAMPLE 1

The lubricating oil stock used in this example was conventionally refined by distillation, followed by furfural extraction and methyl ethyl ketone dewaxing. It is referred to as Arab Light stock and has the following properties:

| | |
|---|---|
| Furfural Dosage, % volume | 180 |
| Tower Temp., °F, Top | 185 |
| Tower Temp., °F, Bottom | 140 |
| Gravity, °API | 30.5 |
| Pour Pt. °F. | 0 |
| Flash Pt., °F. | 420 |
| Sulfur, % wt. | 0.82 |
| Viscosity, S.U.S. at 100°F. | 147.8 |
| Viscosity Index | 106 |
| ASTM Color | L 1½ |

The present procedure was tested by charging a pressure reaction vessel with catalyst for use herein, in this example platinum on alumina (0.6 weight percent Pt), pressurizing the vessel with hydrogen to 1000 psig, heating the reactor system to 550°F and passing a charge of the above lubricating oil stock therethrough at a LHSV of 2 (v/v-hr.). The reactor pressure was maintained and hydrogen was supplied by the passage of 1000 SCF/B of hydrogen through the reactor.

The product lubricating oil stock recovered from the above process, after blending with an additive package comprised of the following components:

0.50 weight percent Di-t-butyl-p-cresol
0.10 weight percent Di-octyl diphenylamine
0.06 weight percent Santolube 70B was tested, along with an untreated sample of the above oil stock, not containing the above additive package, in the RBOT and color tests above described. Also, a sulfur analysis was made of the test product. Those results appear below:

| Oil Sample | Color | RBOT, minutes | S, wt.% |
|---|---|---|---|
| Untreated | 1½ | 205 | 0.82 |
| Treated | ½ | 340 | 0.671 |

The treatment process of the present invention, it is observed, improved the color of the lubricating oil stock from 1½ to ¼ and improved the oxidation test results from 205 minutes to 340 minutes, a 66.7 percent improvement.

EXAMPLE 2

The same procedure and lubricating oil stock as in Example 1 were used in this example with the exception that the oil stock LHSV was maintained at 0.5. The color test indicated a result of one-fourth and the RBOT test resulted in 370 minutes, an 81.4 percent improvement in oxidative stability. Also, the sulfur content of the treated oil stock was measured as 0.493 weight percent.

EXAMPLE 3

The same oil stock was used in this example as in Example 1. The procedure was also that of Example 1, with the exception that reaction temperature was maintained at 650°F. The sulfur content of the treated oil stock was measured as 0.416 weight percent. The color was again one-fourth and the RBOT test result was 334 minutes.

EXAMPLE 4

To establish an upper limit on reaction temperature for the present process, another example was made with the same oil stock and procedure as in Example 3, except that temperature was increased to 700°F. Although the color of the product oil stock was improved to one-eighth, the RBOT test showed that oxidative stability was destroyed with a result of 212 minutes. Therefore, it is expected that the present process should not be performed at temperatures in excess of about 650°F (Example 3).

EXAMPLE 5 – 9

A series of procedure tests were run as in Example 1 and with the same oil stock as in Example 1. However, rather than the same additive package as used in Examples 1–4, the products of these runs were blended with an additive package comprised of the following components:

| Di-t-butyl-p-cresol | Di octyl diphenylamine | Zinc dithio-phosphate | Santolube 70B |
|---|---|---|---|
| 0.5 wt% | 0.1 wt% | 0.07 wt % | 0.04 wt % |

The reactor pressure was maintained at 350 psig and hydrogen was fed to the reactor at 1000 SCF/B. The LHSV was maintained at 2 and the temperature was varied for each run. The products of the runs were evaluated in the RBOT test and Table 1 below details the results.

Table 1

| Example | Temperature, °F | RBOT, minutes |
|---|---|---|
| Untreated Oil Stock (containing the above additive package) | — | 290 |
| 5 | 400 | 345 |
| 6 | 450 | 345 |
| 7 | 500 | 355 |
| 8 | 600 | 290 |
| 9 | 600 | 275 |

A notable conclusion from the above examples is that the optimum hydrofinishing temperature for the Arab Light 319 stock used in Examples 1–9 depends on the additive package used therewith. This data suggests that the additive package used in the process product oil stocks of Examples 1–4 is more effective for low sulfur base stocks (processing usually at conditions of high severity) while the additive package used in Examples 5–9 is more effective for high sulfur base stocks (processing usually at conditions of mild severity).

The difference in additive response due to variation in hydrofinishing severity could have significant implications. For example, good quality, "clean" lube oils, such as light turbine oil could be produced from sour crudes (e.g., Arab Light and Kuwait stocks) via hydrofinishing at higher temperatures and use of the additive package used in Examples 1–4.

In support of the above, note that the only difference between the two additive packages is that the one in Examples 5–9 contains zinc dithiophosphate while the one in Examples 1–4 does not. In present industrial oils (e.g., hydraulic oils) which require anti-wear properties, zinc dithiophosphate is almost an essential component. On the other hand, in oils where cleanliness is the utmost requirement, such as light turbine oil, zinc dithiophosphate has to be excluded. Consequently, as a general practice, light turbine oil has been produced using low sulfur crudes. Now with hydrofinishing according to the present process, such oil products can be obtained from high sulfur crude by treating at higher temperatures to both remove the sulfur and make the product responsive to non-zinc containing additive packages. In actual practice, the lube refining plant can always charge sour crudes and adjust the reactor temperature to suit the product requirements.

EXAMPLES 10–13

In order to demonstrate the fact that in the present process a catalyst as above defined will function better if low in acidity, these examples were conducted. Here, the method of Example 7 was repeated except for the fact that the acidity of the catalyst used herein was further reduced prior to contact with the oil stock by the procedure outlined hereinabove. The catalyst was reduced in hydrogen by heating it to 550°F. It was held at that temperature for 1 hour and then heated to 950°F. Thereafter, it was cooled in flowing hydrogen overnight. The reduced catalyst was then packed in a column and washed with 0.1N solution of ammonia until the wash solution was chloride free. The washed catalyst was dried and calcined again as above and charged to the reactor for testing. The properties of the catalyst before and after the ammonia washing are listed in Table 2.

TABLE 2

| Catalyst Properties | Before Washing | After Washing |
|---|---|---|
| Pt, Wt. % | 0.61 | 0.59 |
| Chlorine, Wt. % | 0.67 | 0.04 |
| Surface Area, m²/g | 439 | 277 |
| Particle Density, g/cc | 1.23 | 1.21 |
| Pore Diameter, A | 45 | 76 |
| Pore Volume, cc/g | 0.496 | .528 |
| Real Density, g/cc | 3.16 | 3.34 |
| Pt Crystal Size, A | 20 | 23 |

The tests were then conducted as in Example 7 with varying temperature, pressure and LHSV. The results are recorded in Table 3 below:

TABLE 3

| Example | T, °F | P, psig | LHSV, v/v-hr. | RBOT, minutes |
|---|---|---|---|---|
| Untreated Oil Stock (containing the above additive package) | — | — | — | 290 |
| 10 | 350 | 350 | ½ | 345 |
| 11 | 400 | 350 | 2 | 375 |
| 12 | 500 | 350 | 2 | 360 |
| 13 | 600 | 350 | 4 | 310 |

Having thus given a general description of the process and means of this invention and provided by way of examples specific embodiments thereof, it is to be understood that no undue restrictions are to be imposed by reason thereof, and minor modifications may be made thereto without departing from the spirit and scope thereof.

What is claimed is:

1. A process for forming a stabilized lubricating oil resistant to oxidation and sludge formation upon exposure to a highly oxidative environment which comprises contacting a high boiling hydrocarbon fraction lubrication oil stock having a sulfur content above about 0.4 weight percent with hydrogen in the presence of a catalyst of low acidity having a chlorine content of less than about 1.5 weight percent comprised of from about 0.1 to about 10 weight percent metal selected from the group consisting of platinum, palladium and a combination thereof on a solid refractory inorganic oxide support, said contacting at a temperature of about 400°F, a pressure in the range of from about 150 psig to about 1200 psig and a weight hourly space velocity in the range of from about 0.1 to about 10.

2. The process of claim 1 wherein said oil stock has a boiling range of above about 600°F.

3. The process of claim 2 wherein said pressure is from about 250 psig to about 600 psig and said weight hourly space velocity is from about 0.5 to about 5.

4. The process of claim 1 wherein said solid refractory inorganic oxide support is alumina; silica;silica combined with an oxide of a metal of Group II-A, III-A, IV-B or V-B of the Periodic Table of Elements; clay selected from the group consisting of montmorillonite, kaolin, halloysite, dickite, nacrite, attapulgite and anauxite; zeolite or combinations thereof.

5. The process of claim 3 wherein said solid refractory inorganic oxide support is alumina; silica; silica combined with an oxide of a metal of Group II-A, III-A, IV-B or V-B of the Periodic Table of Elements; clay selected from the group consisting of montmorillonite, kaolin, halloysite, dickite, nacrite, attapulgite and anauxite; zeolite or combinations thereof.

6. The process of claim 4 wherein said support is alumina.

7. The process of claim 4 wherein said support is silica or silica combined with an oxide of a metal of Group II-A, III-A, IV-B or B-V of the Periodic Table.

8. The process of claim 4 wherein said support is a zeolite.

9. The process of claim 4 wherein said support is a clay selected from the group consisting of montmorillonite, kaolin, halloysite, dickite, nacrite, attapulgite and anauxite.

10. The process of claim 1 wherein said cayalyst is comprised of platinum on alumina.

11. The process of claim 5 wherein said support is alumina.

12. The process of claim 1 wherein said oil stock comprises at least a substantial part of one obtained by fractionation of a crude oil identified as Pennsylvania, Midcontinent, Gulf Coast, West Texas, Amal, Kuwait, Barco, Aramco or Arabian.

13. The process of claim 3 wherein said oil stock comprises at least a substantial part of one obtained by fractionation of a crude oil identified as Pennsylvania, Midcontinent, Gulf Coast, West Texas, Amal, Kuwait, Barco, Aramco or Arabian.

14. The process of claim 1 wherein said oil stock is one obtained by fractionation of crude oil identified as Arabian.

15. The process of claim 3 wherein said oil stock is one obtained by fractionation of crude oil identified as Arabian.

16. The process of claim 1 wherein said catalyst has been ammonia washed whereby it is substantially free of chloride ions.

17. The process of claim 3 wherein said catalyst has been ammonia washed whereby it is substantially free of chloride ions.

18. A process for forming a stabilized reduced sulfur lubricating oil responsive to non-zinc-containing additive packages from high sulfur crude which comprises contacting the oil stock obtained by fractionation of said high sulfur crude, said oil stock having a sulfur content above about 0.4 weight percent, with hydrogen in the presence of a catalyst of low acidity having a chlorine content of less than about 1.5 weight percent comprised of from about 0.1 to about 10 weight percent metal selected from the group consisting of platinum, palladium and a combination thereof on a solid refractory inorganic oxide support, said contacting at a temperature of about 400°F, a pressure in the range of from about 150 psig to about 1200 psig and a weight hourly space velocity in the range of from about 0.1 to about 10.

19. The process of claim 18 wherein said oil stock obtained by fractionation of said high sulfur crude has a boiling range of above about 600°F.

20. The process of claim 19 wherein said pressure is from about 250 psig to about 600 psig and said weight hourly space velocity is from about 0.5 to about 5.

* * * * *

UNITED STATES PATENT AND TRADEMARK OFFICE
CERTIFICATE OF CORRECTION

PATENT NO. : 3,979,279
DATED : September 7, 1976
INVENTOR(S) : TSOUNG-YUAN YAN

It is certified that error appears in the above-identified patent and that said Letters Patent are hereby corrected as shown below:

Column 4, line 39       "spend" should read --spent--.
Column 7, line 45       "herein" should read --therein--.
Column 8, lines 27-28   "lubrication" should read --lubricating--.

Signed and Sealed this

Twenty-first Day of December 1976

[SEAL]

Attest:

RUTH C. MASON
*Attesting Officer*

C. MARSHALL DANN
*Commissioner of Patents and Trademarks*